(12) United States Patent
Fletcher et al.

(10) Patent No.: US 11,238,220 B1
(45) Date of Patent: Feb. 1, 2022

(54) DYNAMIC USER INTERFACE FRAMEWORK

(71) Applicant: Wells Fargo Bank, N.A., San Francisco, CA (US)

(72) Inventors: Joel Shannan Fletcher, Belmont, NC (US); Ashley L. Threatt, Rock Hill, SC (US); Wesley N. Wright, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 420 days.

(21) Appl. No.: 14/941,035

(22) Filed: Nov. 13, 2015

(51) Int. Cl.
*G06F 40/221* (2020.01)
*G06F 40/14* (2020.01)

(52) U.S. Cl.
CPC ............ *G06F 40/221* (2020.01); *G06F 40/14* (2020.01)

(58) Field of Classification Search
CPC .............................. G06F 17/2247; G06F 17/24
USPC .................. 715/234, 235, 236, 238, 239
See application file for complete search history.

(56) References Cited

U.S. PATENT DOCUMENTS

| | | | |
|---|---|---|---|
| 6,901,403 B1* | 5/2005 | Bata ................... | G06F 17/30572 |
| 7,024,415 B1* | 4/2006 | Kreiner ............... | G06F 17/2247 |
| 7,840,605 B2 | 11/2010 | Ruan et al. | |
| 7,996,299 B2 | 9/2011 | McCue et al. | |
| 8,095,565 B2 | 1/2012 | Dengler et al. | |
| 8,200,710 B2 | 6/2012 | Sagi et al. | |
| 8,381,113 B2 | 2/2013 | Kamdar et al. | |
| 8,397,161 B1* | 3/2013 | Shah ..................... | G06F 17/218 715/234 |
| 8,707,398 B2 | 4/2014 | Rauh et al. | |
| 8,892,585 B2 | 11/2014 | El Husseini et al. | |
| 9,239,669 B2* | 1/2016 | Zhang ................... | G06F 3/0484 |
| 9,514,099 B1* | 12/2016 | Ringhiser ............. | G06F 17/211 |
| 2002/0010716 A1* | 1/2002 | McCartney ......... | G06F 17/30896 715/236 |
| 2003/0154289 A1* | 8/2003 | Williamson ......... | G06F 17/30876 709/227 |
| 2005/0050096 A1* | 3/2005 | Gomes .................. | G06Q 10/06 |
| 2005/0097008 A1* | 5/2005 | Ehring .................. | G06F 17/211 715/205 |

(Continued)

OTHER PUBLICATIONS

Steven Holzner; Inside XSLT; Jul. 20, 2001; Que Publishing; pp. 1-34 and 194.*

(Continued)

*Primary Examiner* — Andrew R Dyer
(74) *Attorney, Agent, or Firm* — Schwegman Lundberg & Woessner, P.A.

(57) ABSTRACT

In one example, a method for generating a dynamic user interface may include the use of a user interface design framework including metadata templates, user interface interpreters, and viewing technology to enable a dynamic user interface generation and output. In some examples, the user interface design framework may include electronic operations implemented at servers and clients for parsing a definition for a user interface in a first markup language (such as XML), implementing features of a selected view technology (such as JSF or HTML5) for generation of the user interface output, and generating the user interface output in the second markup language (such as HTML and associated JavaScript scripting) according to the selected view technology.

15 Claims, 7 Drawing Sheets

(56) References Cited

U.S. PATENT DOCUMENTS

| | | | |
|---|---|---|---|
| 2005/0149861 A1* | 7/2005 | Bishop | G06F 9/543 715/209 |
| 2005/0257158 A1* | 11/2005 | Lombardo | G06F 17/2288 715/751 |
| 2007/0150820 A1 | 6/2007 | Salvo | |
| 2008/0120689 A1* | 5/2008 | Morris | G06F 9/445 726/1 |
| 2008/0276218 A1 | 11/2008 | Taylor et al. | |
| 2010/0094926 A1* | 4/2010 | Shukla | G06F 21/6227 709/203 |
| 2011/0099294 A1* | 4/2011 | Kapur | H04L 67/32 709/246 |
| 2012/0166983 A1 | 6/2012 | Demant et al. | |
| 2013/0086467 A1* | 4/2013 | Weber | H04W 4/18 715/239 |
| 2013/0173402 A1* | 7/2013 | Young | G06Q 30/0631 705/14.73 |
| 2013/0174010 A1* | 7/2013 | Le Chevalier | G06F 17/227 715/234 |
| 2013/0174017 A1* | 7/2013 | Richardson | G06F 17/21 715/234 |
| 2014/0136958 A1* | 5/2014 | Scattergood | H04L 67/2823 715/236 |
| 2014/0310599 A1* | 10/2014 | Clift | H04N 21/4126 715/719 |
| 2015/0089475 A1 | 3/2015 | Geng et al. | |
| 2016/0050167 A1* | 2/2016 | Ramachandran | H04L 51/046 709/204 |

OTHER PUBLICATIONS

"Technology stack;" PC Mag Encyclopedia; Apr. 3, 2013; PCMag.com; pp. 1-2.*

Efstathios Chatzikyriakidis; How to transform XML into HTML5 using XSLT; Jun. 3, 2013; efxa.org; pp. 1-4.*

* cited by examiner

DYNAMIC USER INTERFACE FRAMEWORK

TECHNICAL FIELD

Embodiments described herein generally relate to electronic processing activities occurring in the design, generation, and output of user interface platforms, and in particular, but not by way of limitation, to a system and method for generating website user interfaces from a metadata-based schema.

BACKGROUND

A variety of user interfaces are designed to perform functions and display information. For example, a user interface of a particular web page may include a large number of functions and displayed input controls to receive interaction from a user. The programming used to create this web page is often based on specialized programming, to either include the content directly within the web page, or to present a user interface control that is created as a result of a specialized query or programmed data component.

The useful life of a web page and other website user interfaces, however, is typically very short, as content items, layout, and functions (and as the underlying scripting and markup language supporting these items) change over time. Thus, many website user interfaces need to be redeployed, requiring a large amount of time and resources and a loss of investment for website design and programming code that is reviewed and rewritten. As a result, the process to change and update a website user interface to different programming technologies can involve significant resources and efforts.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
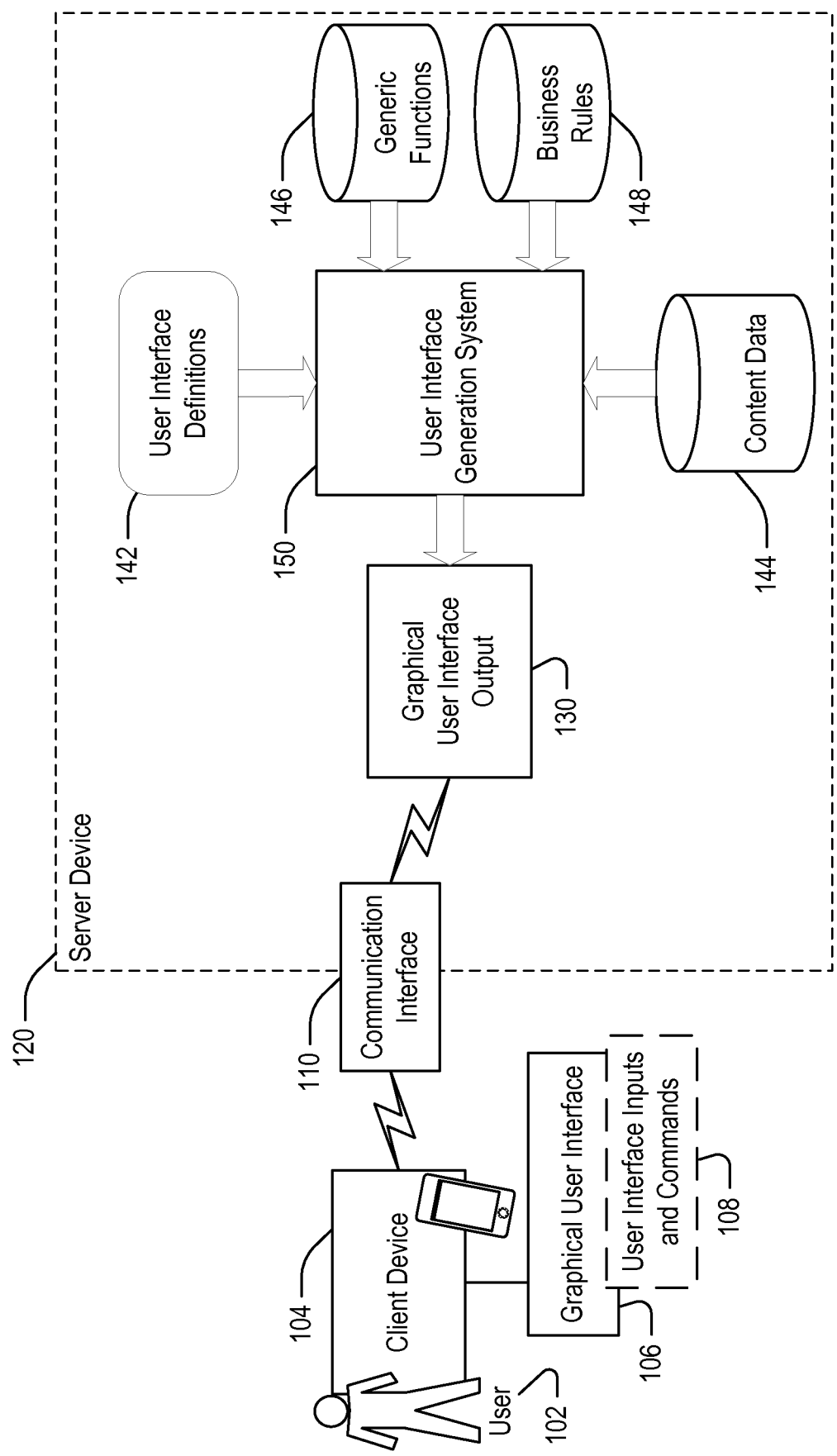
FIG. 1 is a diagram of an electronic communication environment depicting operations and interactions with a user interface generation system, according to various examples.

In the following description, for purposes of explanation, numerous specific details are set forth in order to provide a thorough understanding of some example embodiments. It will be evident, however, to one skilled in the art that the present disclosure may be practiced without these specific details.

In various examples described herein, a dynamic user interface framework is provided to implement dynamic user interface output for a network-accessible user interface. This dynamic user interface framework includes a metadata-driven architecture, used to define layout, rendering features, and user functions, in a format that is interpreted at runtime or on-demand and can be rendered into multiple view technologies. Further, this dynamic user interface framework includes functionality such as dynamic translation of data structures, publishing of user interface data to templates, and security features that are not provided from other custom or bespoke programming interfaces.

Existing techniques for designing user interfaces do not suitably address the technical limitations that are addressed by the presently described dynamic user interface framework. For example, in a large website involving many different user interfaces for different types of users, the presentation output that is provided with existing technologies may involve hard-coded programming to output different security features, layouts, and content (especially if customizing content to the privilege level of the user and any information services associated with the user). Further, the continual change in client viewer device capabilities, supported display languages, and other changes to technologies used in web user interfaces and devices leads to a typically very short life span for a website. This often leads to a full rewrite of a user interface to maintain support for an application, or incompatibility issues as different browser display language standards are adopted and abandoned.

In one example, the presently described user interface framework operates by providing an abstraction layer between the rendering of the user interface, and the content building blocks of the user interface. As described herein, a set of metadata templates, such as designed with XML metadata, may be used to render content at runtime, using a conversion to one or more browser or application display technologies. As described herein, the use of a metadata template provides the ability to not only create the content elements of a user interface, but also define any logic associated with the output or interaction capabilities of the user interface.

In further examples, the presently described user interface framework provides a metadata-driven architecture that is interpreted at runtime, and may provide output from a first markup language (e.g., XML) into a second markup language (e.g., HTML) based on a number of other design or scripting languages and formats using a specialized "technology stack". For example, separate technology stacks may provide output specialized to JAVA SERVER FACES (JSF), ADOBE/APACHE FLEX (FLEX), HTML5, the YAHOO! USER INTERFACE LIBRARY 3 (YUI3), ANGULARJS or JQUERY respectively, or to similar standardized browser scripting and markup language outputs. The ability to generate the same content into respective technology stacks provides the ability to render the site based on any number of desired languages supported by the technology, while keeping the base programming and design that is expressed in metadata unchanged.

FIG. 1 is a diagram of an electronic communication environment, depicting operations and interactions with a user interface generation system 150 according to one example. FIG. 1 illustrates a scenario in which a user 102 operates a client device 104 to establish a data connection via a communication interface 110 with a server device 120. For example, the data connection may be established to a website server that generates and renders website content with graphical user interface output 130, to provide the generation and transmission of content via the communication interface 110 to be displayed in a client-side graphical user interface 106. The client-side graphical user interface 106 receives user interface inputs and commands 108 from the user 102, which are then communicated back to the server device 120 via the communication interface 110.

The communication of the graphical user interface output 130 from the server device 120 to the client device 104 may involve a variety of devices, networks, interfaces, and subsystems to assist the operation of a communication session for a website, mobile application, or other embodiment of the graphical user interface 106. Although only one instance of the client device 104 and server device 120 is depicted, it will be understood that the graphical user interface output 130 or variations of this output may be provided to a plurality of communication devices and for a plurality of web pages or content sources.

As further shown in FIG. 1, the graphical user interface output 130 is generated from the user interface generation system 150 as a result of relevant templated and structured inputs. The user interface generation system 150 is configured to establish the relevant output format (e.g., website or mobile app output) as a result of four primary data inputs: user interface definitions 142, generic functions 146, business rules 148, and content data 144. These data inputs represent the template and structure that will be customized to the particular technology stack for the graphical user interface output 130.

For example, the user interface definitions 142 may include XML-format definitions that express the characteristics of the user interface for the graphical user interface output 130 in a standardized, parseable format. The generic functions 146 may include XML- or other standardized-format definitions for user interface functions that can be invoked for user interface functionality in an output screen such as controls, forms, and layouts in the graphical user interface output 130. The business rules 148 may include user interface behavior and display rules that are parsed to generate certain characteristics of the interface in the graphical user interface output 130. The content data 144 may include any number of content items for display in the graphical user interface output 130, including graphics, multimedia content, and other static or dynamically generated output content.

The graphical user interface output 130 and associated interaction features for the graphical user interface output 130 are selected and arranged through the inputs 142, 144, 146, 148 as the inputs are parsed and interpreted by the user interface generation system 150. For example, the user interface generation system 150 may parse the user interface definitions 142 (e.g., as expressed in an XML format) to determine characteristics of the user interface, to determine which functions of the generic functions 146 to invoke, to determine which rules of the business rules 148 to invoke, and to determine which content of the content data 144 to include. Accordingly, the user interface definitions 142 serve as the definition for the content to be served from the graphical user interface output 130 (and, likewise, control the available inputs and commands 108 that are accessible and displayed on the client device 104).

Figure 2:
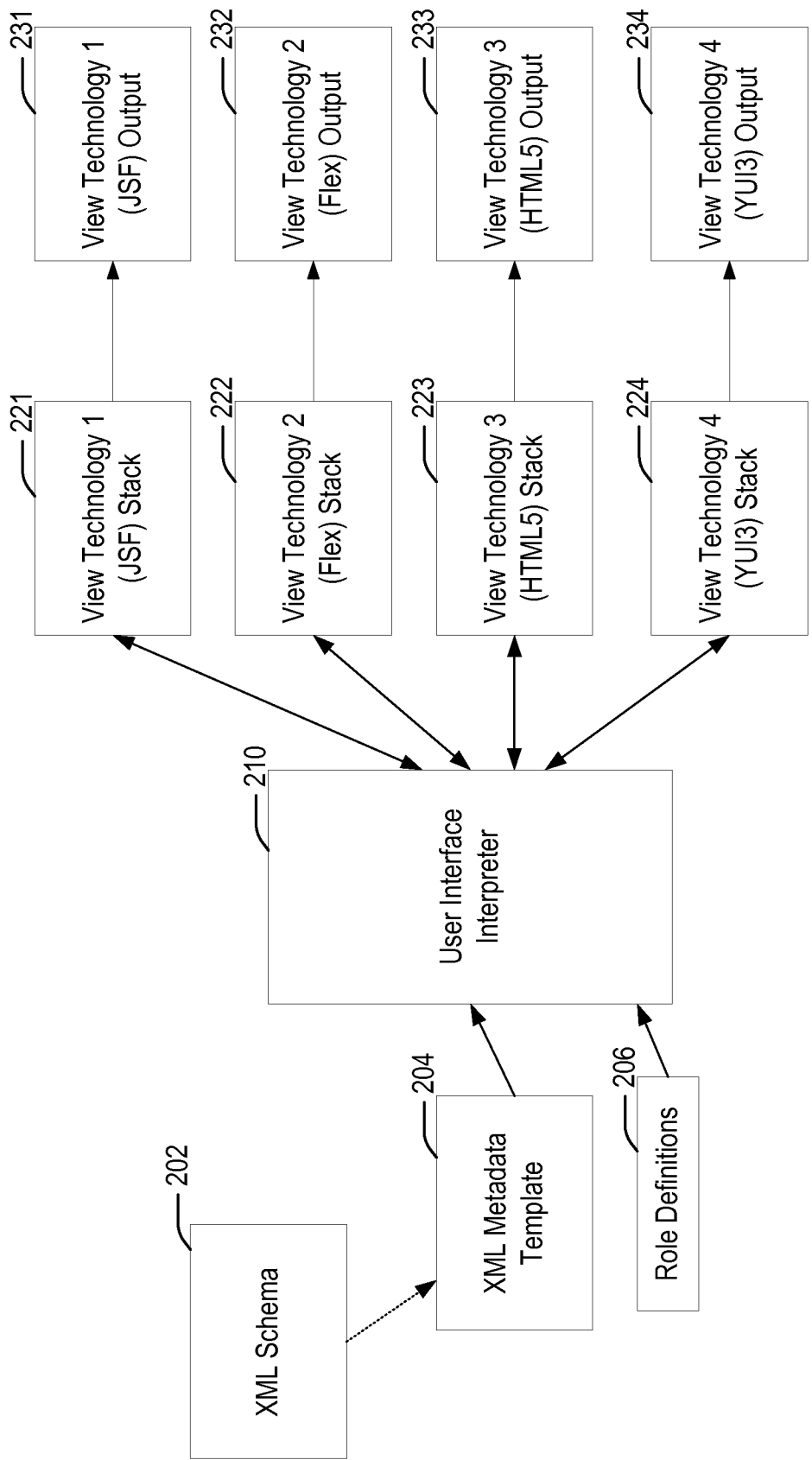
FIG. 2 is a diagram depicting interactions between schemas, templates, and interpreter output in a user interface generation system, according to various examples.

Continuing an example of dynamically-generated user interface output, FIG. 2 provides a diagram depicting interactions between schemas, templates, and interpreter output in a user interface generation system according to one example. The characteristics of the dynamic user interface, as generated by a user interface interpreter 210, are defined according to an XML data schema 202, a XML metadata template 204 that includes a specific implementation, and rules or constraints on the user interface from one or more role definitions 206.

The XML data schema 202 establishes available options and characteristics of one or more screens of a dynamic user interface, through the definition of XML nodes, values, and data structures. Based on the format of the XML data schema 202, the XML metadata template 204 is populated (e.g., populated manually or as a result of a programmatic design process). The XML metadata template 204 is retrieved, parsed, and interpreted for dynamically rendering a screen layout at runtime or on-demand by the user interface interpreter 210, exposing defined functions and data of the dynamic user interface. The set of role definitions 206 is accessed and used to define the characteristics of the user interface based on user, security, or like functional roles.

The XML metadata template 204 can be used to provide output for a number of characteristics of a user interface output, including screens that are customized for different users and roles. The XML metadata template 204 may include multiple views or features that are turned on/off based on the particular user rule or level associated with the user. The output of certain content or features, modifications of certain data, and interactions with certain data, attributes, or values, may be associated with various user roles and determined at runtime. Such outputs may be invoked in the abstracted layer provided by the XML metadata template 204 without hardcoded programming.

The user interface (UI) layout and actions are defined abstractly using the XML metadata template 204, to be interpreted at runtime or on-demand and rendered into one or multiple view technologies by the user interface interpreter 210. The user interface interpreter 210 may invoke the use of a view-technology "stack" to generate content for a particular programming language or design. Data structures defined in the back-end data model (such as indicated by the XML metadata template 204) may be generically converted into language-specific data structures such as JavaScript Object Notation (JSON) or ActionScript objects consumable by view technologies such as JSF, FLEX, HTML5, YUI3, ANGULARJS, JQUERY, or other output formats. The technology stacks usable with the presently described embodiments are not limited to this list of examples, however. It will be understood that any technology stack for which an interpretation layer can be (or is already) written can be utilized.

For example, in FIG. 2, a first view technology stack 221 (JSF) is used by the user interface interpreter 210 to produce a first view technology output 231 (JSF formatted output); a second view technology stack 222 (FLEX) is used by the user interface interpreter 210 to produce a second view technology output 232 (FLEX formatted output); a third view technology stack 223 (HTML5) is used by the user interface interpreter 210 to produce a first view technology output 233 (HTML5 formatted output); a fourth view technology stack 224 (YUI3) is used by the user interface interpreter 210 to produce a fourth view technology output 234 (YUI3 formatted output). The technology stack that is used to produce content output may be selected based on browser or viewer capabilities, administrator selection, or other factors.

The use of the XML metadata template 204 and the respective technology stacks 221, 222, 223, 224, removes the need for custom bi-directional translation between the desired model the view output. Further, the use of the XML metadata template removes the need for app developers to write the application layer and language-specific implementations. Thus, the user interface definitions for the user interface interpreter 210 is specific to the use of the XML metadata template 204 rather than hard-coded implementations. The UI rendering process for multiple technology stacks can be controlled with a XML format definition—without application coding—resulting in a consistent look and feel and navigation across a large number of webpages according to a known schema.

Fields defined within the XML data schema 202 may include certain view layout attributes in an abstract UI definition, such as the number of columns presented in a form layout. The user interface interpreter 210 may dynamically (and automatically) layout the forms based on such attributes. View role security may also be abstracted into XML role metadata from the XML data schema 202 or from the role definitions, allowing roles and features to be interpreted at runtime or on-demand and consistently enforced across multiple view technologies.

In further examples, dynamic history and dynamic search functionality and user interface screens can be generated with use of the user interface interpreter 210. Because detail screens are interpreted at runtime or on-demand from the abstract UI definition (e.g., the XML metadata template 204), a generic UI algorithm may dynamically add history screens and search screens based on the same abstract UI definition, without any custom coding required. For example, every field defined on a "detail" display screen can be searched from the dynamically rendered search screen without any application coding, because functionality for the specific view stack may be built into the user interface.

In further examples, other generic user functions can be generated and invoked through the use of the XML metadata template 204, the role definitions 206, or other additional functional definitions. Common user interface interaction functions, such as adding a new record to a data set, saving or deleting changes to a data set, navigation through a data set, and the like, may be provided with a single generic implementation to be invoked by the abstract UI definition (e.g. the XML metadata template 204 or another defined markup language definition) without any custom implementation. This allows for consistency of user interface across the entire system, and simplifies and reduces boilerplate code.

Figure 3:
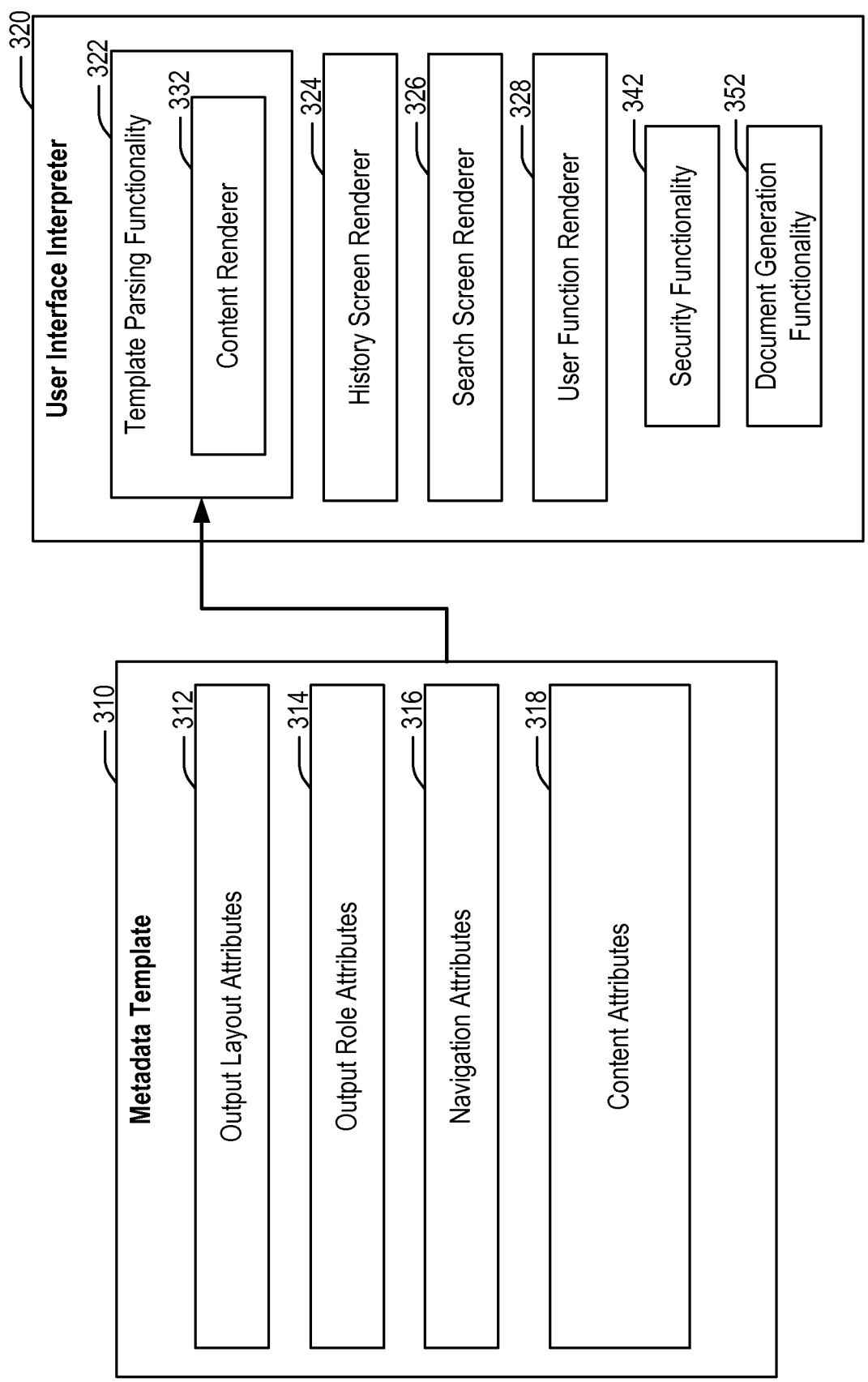
FIG. 3 is a diagram depicting a relationship between a template and user interface interpreter in a user interface generation system, according to various examples.

FIG. 3 illustrates a further example of a metadata template 310 and a user interface interpreter 320 used in a user interface generation system, according to various examples. As shown, the metadata template 310 includes a series of attributes that can be used to define or invoke certain user interface features or functions. Likewise, the user interface interpreter 320 includes a series of renderers and functionality to implement the defined or invoked user interface features or functions. Although multiple attributes, renderers, and functionality units are depicted in FIG. 3, it will be understood that a use of an XML-format template for the implementation of a particular user interface (such as web page or mobile app screen) may only use a subset of these attributes, renders, and functionality units.

As shown, the metadata template 310 may include a series of attributes, including output layout attributes 312, output role attributes 314, navigation attributes 316, and content attributes 318. The output layout attributes 312 may be used to define output layout characteristics for presentation in an instance of a user interface (e.g., web page). The output role attributes 314 may be used to define security or user roles that correspond to available functions for presentation in the instance of the user interface. The navigation attributes 316 may define standardized navigation content and capabilities for presentation in the instance of the user interface. The content attributes 318 may define standardized or common content features for presentation in the instance of the user interface.

The metadata template 310 may be provided to a template parsing functionality 322 of the user interface interpreter 320 in an XML data format, for example. The user interface interpreter 320 parses the metadata template 310 to generate the user interface according to the characteristics of the attributes 312, 314, 316, 318 described above. The template parsing functionality 322 may further include a content renderer 332 that generates specific types or formats of content invoked by the attributes or like template data values.

Other renderers and functionality may be provided from the user interface interpreter 320 to interpret metadata template definitions. Operable renderers may include a history screen renderer 324 to render a common set of history screens or content sections (discussed above for FIG. 2); a search screen renderer 326 to render a common set of search screens or content sections (discussed above for FIG. 2); and a user function renderer 328 to operate user interaction functions for the screens or content sections (discussed above for FIG. 2).

The user interface functionality generated by the user interface interpreter 320 may include security functionality 342 to limit or define views and presentations of the user interface based on security considerations. For example, row data security may be implemented within the user interface, to intercept every query, and to add row security criteria dynamically added to the query expression. The row security criteria may be interpreted from model security constraints defined for a given user or role. Such security functions can be used to ensure that data is secured during presentation in the user interface without having application developers to write custom row security logic.

The user interface functionality provided in the user interface interpreter 320 may also include document generation functionality 352 to generate document content. Generic publishing of user interface outputs to document templates may be implemented through the use of tokens that are made available to templates and clauses, to generate custom documents on the fly. The generation of such custom documents allows source data to be accessed from any field in the entire user interface without needing additional code programming (and allowing for documents generated from new user interface screens added later). Dynamic resolution of all user interface data points may be made available to document templating via a generic token binding implementation invoked by the metadata template 310.

The aforementioned use of the metadata template 310 and the user interface interpreter 320 provides a number of technical benefits for the implementation of user interfaces: easier transition to different user interface scripting and rendering languages by only needing to change the interpretation layer, less need for developers to be experts in any one programming technology or language, and consistency across screens and screen functionality because the user interface is defined and interpreted the same across all display technologies. Development speed and deployment ability is increased because the user interface generation system produces the user interface screen output dynamically and on-the-fly, rather than relying on application developers having to specifically code screens and functions in specialized languages. Further, the aforementioned use of the metadata template 310 and the user interface interpreter 320 offers the ability to enact standard CRUD (create, read, update, and destroy) data actions directly within a user interface screen, without having to write code beyond the desired business logic, requirements, or rules.

As discussed above, the metadata template 310 described herein may be defined in XML format. In one example, the metadata template 310 is created from multiple XML documents, such as a first XML document defining "View" metadata, and a second XML document defining "Role" metadata. In this example, the metadata template may be implemented as follows:

User Interface View Entry Points

Within the View metadata, entry points generally allow a page to access a master collection of data. Users can choose from a list of entry points at any time to begin working on a new task. For example, entry points for "Activity" and "Logistic Team Queue" user interface views may be invoked as follows:

```
<tns:entryPointList>
    <tns:entryPointView        displayName="Activity"
        enabled="false" sortorder="10" visible="false"
        <tns:masterListViewName>activityMasterListView</
            tns:masterListViewName>
    </tns:entryPointView>
    <tns:entryPointView    displayName="Logistic    Team
        Queue"    enabled="false"    sortorder="11"
        visible="false"
        <tns:
            masterListViewName>logisticTeamQueueListView</
            tns:masterListViewName>
    </tns:entryPointView>
</tns:entryPointList>
```

In this example, each entry point node will be rendered as an option in the Entry Point UI in runtime or on-demand (e.g., in a Flex UI or in a HTML5 UI). The masterListViewName node within the entry point node tells the system where to navigate when a particular entry point is selected. (These names can correspond to other view metadata files.) Thus, when the first entry point (with displayName=Activity) is clicked on, the system will find an XML metadata artifact with the name activityMasterListView and it will then interpret that metadata and render the newly interpreted view.

Thus, if a user interface developer wishes to add a new entry point, the developer can simply add a new entryPoint node to the XML, define the display name to display, and note the view to display when that entry point is selected. The sort order among the entry points defined in the XML may be defined, along with new role metadata (discussed below) for the new entry point.

Role XML Metadata

In the XML example above, each entry point includes Boolean options such as visible and enabled. This can be set as false in the metadata files, because each metadata file includes a corresponding role file that defines which options should be turned on for each role. For example, the following roles may be defined for "Party" roles:

```
<tns:entryPoint entryPointName="Party">
    <tns:entryPointRoleSecurity  roleName="PartyCapturer"
        enabled="true" visible="true"/>
    <tns:entryPointRoleSecurity
        roleName="PartyLeadManager"        enabled="false"
        visible="false"/>
    <tns:entryPointRoleSecurity roleName="PartyProcessor"
        enabled="true" visible="true"/>
    <tns:entryPointRoleSecurity   roleName="PartyReleaser"
        enabled="true" visible="true"/>
    <tns:entryPointRoleSecurity
        roleName="PartyViewOnly"           enabled="true"
        visible="true"/>
    <tns:entryPointRoleSecurity roleName="System-Admin-
        istrator" enabled="true" visible="true"/>
    <tns:entryPointRoleSecurity
        roleName="ActivityInquiry"         enabled="true"
        visible="true"/>
</tns:entryPoint>
```

At runtime, the XML metadata and the role metadata may be combined in a least restrictive manner so that the interpretation from metadata to a user interface output considers what elements the user can access based on a roleset. For example, with the example of the "Party" role above, the Party entry point is visible for PartyCapturer but not visible for PartyLeadManager roles. Thus, if a user logs in under the PartyCapturer role only, they would see the Party entry point. If a user logs in who has the PartyLeadManager role only, they would not see the entry point. If a user logs in with both the PartyCapturer and PartyLeadManager roles, they would see the entry point because they have least one role that grants them that access.

Other nodes in the XML View Metadata can define similar concepts. For example, fields and columns can define whether a field can be viewed, edited, or whether it is required in the same fashion using the role metadata files.

View Types

A variety of views may be defined and invoked by the XML definitions. These may include:

MasterListView: a view that shows a master collection of data and can be used from an entry point. In one example, this kind of view will display all of one kind of data so that a user can start work by choosing any record to work on.

MasterTreeView: a view that shows a master collection of data and can be used from an entry point. In one example, the difference between a MasterTreeView and a MasterListView is that the MasterTreeView is shown in a hierarchical format.

HeaderLineItemView: a view that shows the details of one record. These views can also have related data shown via line item grids or reference other views to show on related tabs. A HeaderLineItemView can be shown when a user drills into a record from a MasterListView, MasterTreeView, ChildListView, or LineItemGrid. A HeaderLineItemView can also be shown when changing tabs to a tab backed by a single record.

ChildListView: a view that shows a collection of related data to a parent record. A ChildListView is displayed when changing tabs to a tab backed by many records.

LookupView: a view that is used to search for data. The primary use of LookupViews are to find data to populate a High Volume Select control.

Use of XML schema

In one example, all of the view metadata must conform to a view schema, such as an XML Schema Definition, "XSD"

file "metaViewSchema.xsd", and all of the role metadata must conform to a role schema, such as XSD file "metaRoleSchema.xsd." Such schemas may be used to enforce characteristics of the various views and rules, and the required characteristics to invoke a user interface instance.

Figure 4:
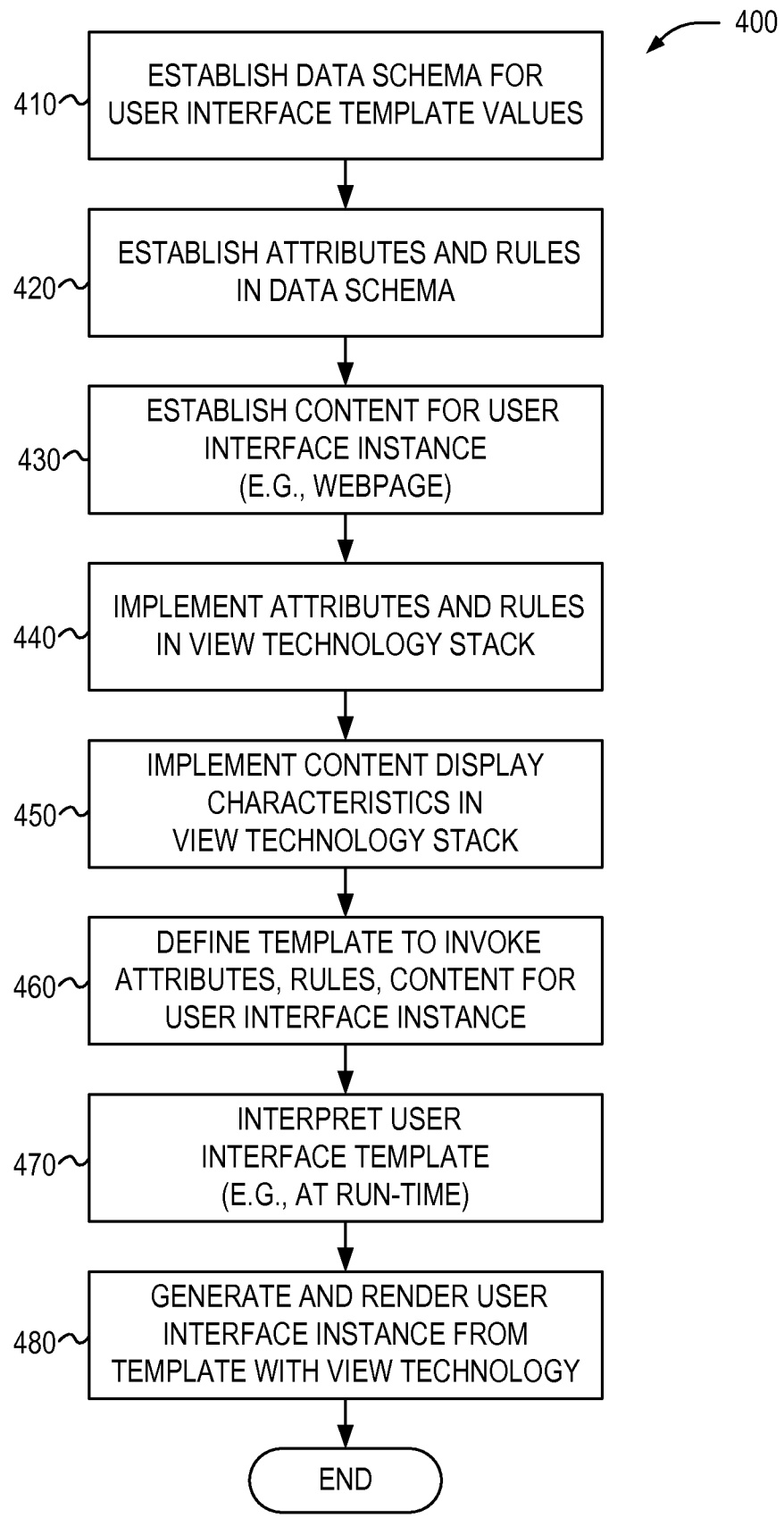
FIG. 4 is a flowchart of an example sequence of events for generating a computer-based user interface in a user interface generation system, according to various examples.

FIG. 4 depicts a flowchart 400 of an example sequence of events for defining a computer-based user interface with a user interface generation system, according to another example. For example, the sequence of events may include the use of the aforementioned view and role schemas (defined in an XSD file), and a user interface template (defined in an XML format).

The depicted steps of the flowchart 400 include the establishment of a number of data values used in the definition of the user interface, and available actions and content in the user interface. For example, this may include the establishment or definition of a data schema for a template (operation 410), such as an XML data schema for an intermediate definition of available data values and tags. This may also include the establishment or definition of attributes and rules in the data schema (operation 420), such as the security-based roles and functionality restrictions discussed above. This may further include the establishment or definition of content for the user interface such as text, graphics, and other features of the user interface instance (operation 430).

Based on the data schema and available content values, one or more implementations of the user interface instance may occur within respective technology stacks. This may include the implantation of attributes and rules in a particular technology stack (operation 440), such as may be provided by the programmatic logic that is configured to output JSF attributes, for example, from interpretation of a defined data schema. Further, this programmatic logic may include logic to parse content display characteristics in the view technology stack (operation 450), including specialized display rules and layouts.

Based upon a definition of the data schema and one or more view technology stacks, a user interface template (such as an XML metadata template) may be used to invoke an instance of a user interface in a particular view technology. The definition of the template may invoke attributes, rules, content (operation 460), from XML or other metadata nodes that indicate the desired characteristics of the user interface. This user interface template then may be parsed and interpreted (operation 470), such as is performed by a web server at run time or on-demand. As a result, an instance of the user interface is generated and rendered in the determined view technology (operation 480), such as may be performed by a web server using a JSF technology stack, for displaying dynamic content in a webpage to website users.

Figure 5:
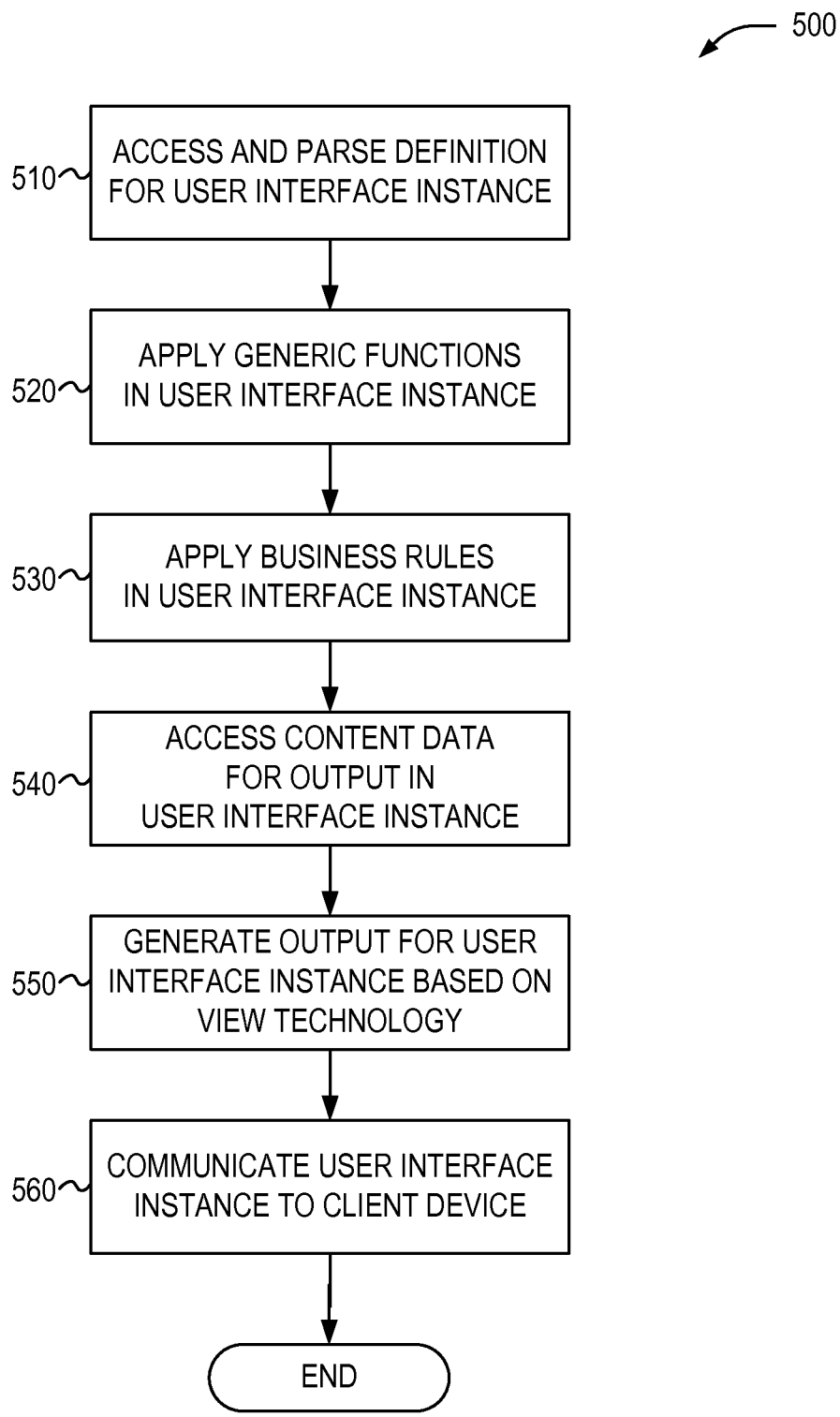
FIG. 5 is a flowchart of an example method of use for a dynamic metadata-based user interface generation system, according to various examples.

FIG. 5 illustrates a flowchart 500 for a method of generating a website output with use of a dynamic metadata-based user interface generation system, according to various examples. The method of the flowchart 500 may be performed by any of the components, logic, or systems described herein.

In an example, at block 510, the method begins by accessing and parsing a definition for a user interface instance. For example, this definition may be expressed in an XML format. The representation of the user interface instance may be modified, at block 520, by the application of generic functions, and at block 530, by the application of business rules. For example, the definition of the user interface instance (and associated rules and metadata) may indicate which user interface functionality will be generated or otherwise included within a particular webpage user interface.

The method of the flowchart 500 further includes the access and use of content data for inclusion in the user interface instance, at block 540. Based on the parsed definition, the application of rules and functions, and the available content data, the output for the user interface instance is then generated, at block 550. For example, this may include the generation of content for a web page according to a specific view technology and the capabilities of the client viewing device. This information can then be communicated in a user interface instance such as a webpage or web application (web app), as in block 560.

Figure 6:
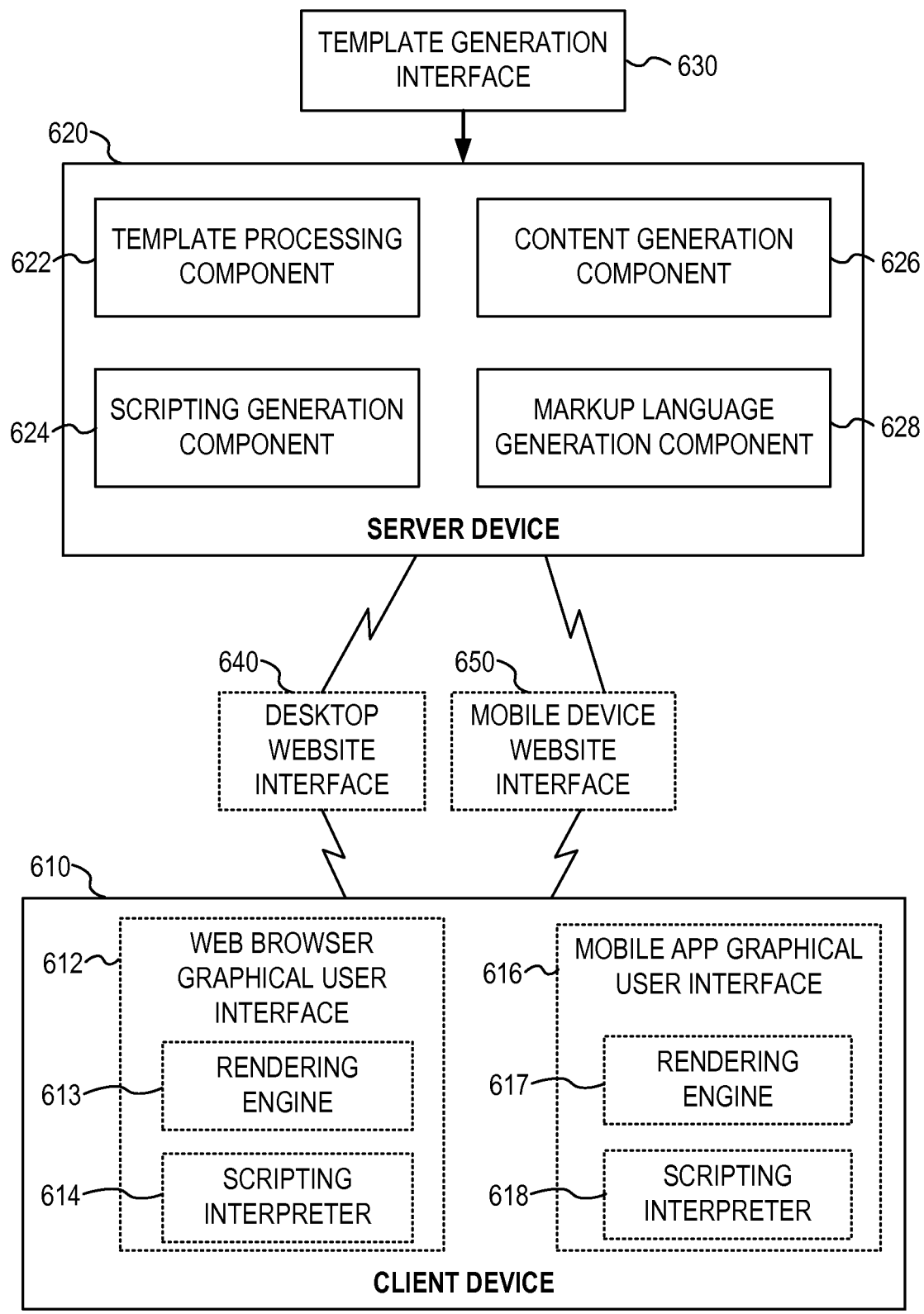
FIG. 6 illustrates an example block diagram of a server device, client device, and website interfaces used in connection with the operation of a user interface generation system, according to various examples.

FIG. 6 illustrates a block diagram for components of various devices used in operations with devices in a user interface generation system according to an example. For example, based on the user interface scenarios previously described, the electronic devices that interact within a user interface generation system may include a client device 610, server device 620, and website interfaces 650, 650 to facilitate communications between the devices.

In an example, the client device 610 includes various components that provide for the rendering of the user interface functionality, including functionality from two respective interfaces, a web browser graphical user interface 612 and a mobile app graphical user interface 616. As shown, each of the graphical user interfaces 612, 616 includes a rendering engine 613, 617 to render and output content (e.g., HTML and graphics) in the respective user interface, and a scripting interpreter 614, 618 to execute scripting commands (e.g., JavaScript commands) and user interactivity functions in the respective user interface. The functionality that is provided, however, may be dependent on the technology stack used by the server device 620 to generate the respective website interface 640, 650.

In some examples, a client device may present multiple graphical user interfaces 612, 616 that include different versions of the user interface, such as to access the desktop website interface 640 or the mobile device website interface 650 respectively. In other examples, only one of the user interfaces may be utilized at or offered to the client device. And in still other examples, a common user interface and technology stack may be utilized in both of the graphical user interfaces 612, 614, but with certain features or layouts of the user interface disabled or enabled (such as depending on whether a desktop or mobile site is accessed).

In an example, the server device includes a template processing component 622 to interpret and process a representation of a user interface template (such as an XML template defined according to a schema of a first markup language); a scripting generation component 624 to generate scripting functionality in the user interface based on the user interface template; a content generation component 626 to generate and update content values (e.g., text values) in the user interface based on rules, attributes, or content items as indicated in the user interface template; and a markup language generation component 628 to generate markup language (e.g., a second markup language such as HTML) for user interface rendering as indicated in the user interface template.

In an example, a template generation interface 630 is operated to design the user interface template through programmatic methods. For example, the template generation interface 630 may provide a visual design interface or integrated development environment (IDE) to generate the user interface template according to a schema (such as the XML template). In other examples, the template generation interface may be operated by various automated tools to programmatically generate features of the user interface template.

In some examples, the selection and use of the technology stack may be provided output with the use of a single programmatic stack or logic. In other examples, the use of the technology stack may provide output that is customized to the compatibility of devices, such as one technology stack available used for desktop web viewing in desktop browsers, and another technology stack available for mobile device web viewing in mobile browsers. Thus, it will be apparent that the output provided with the website interface (including the use of new programming languages and schematics) could be customized to any number of languages or formats, as implemented through the addition or substitution of an appropriate technology stack.

The communication technologies used in the preceding examples may involve any number of variations. For example, returning to FIG. 1, the communication interface 110 may connect the client device 104 and the server device 120 through the use of any number of communication network technologies. In various examples, the devices and subsystems of the examples may communicate via one or more networks, which may include one or more of local-area networks (LAN), wide-area networks (WAN), wireless networks (e.g., IEEE 802.11 or cellular networks), the Public Switched Telephone Network (PSTN) network, ad hoc networks, cellular, personal area networks or peer-to-peer (e.g., BLUETOOTH®, Wi-Fi Direct), or other combinations or permutations of network protocols and network types. The network may include a single local area network (LAN) or wide-area network (WAN), or combinations of LANs or WANs, such as the Internet.

The definitions and stored data implemented in connection with the user interface generation system 150 and the components of the server device 620 may include any number of data sources (including external, cloud-connected data services), and may be implemented in connection with a database management system, database, data service, or data store. The data representations and templates discussed herein may be provided by any number of XML formats or like data definition formats. Although many of the user interface examples included herein were discussed with reference to web page user interfaces for browsers, it will be understood that other variations of user interfaces and server/client applications may be implemented.

Figure 7:
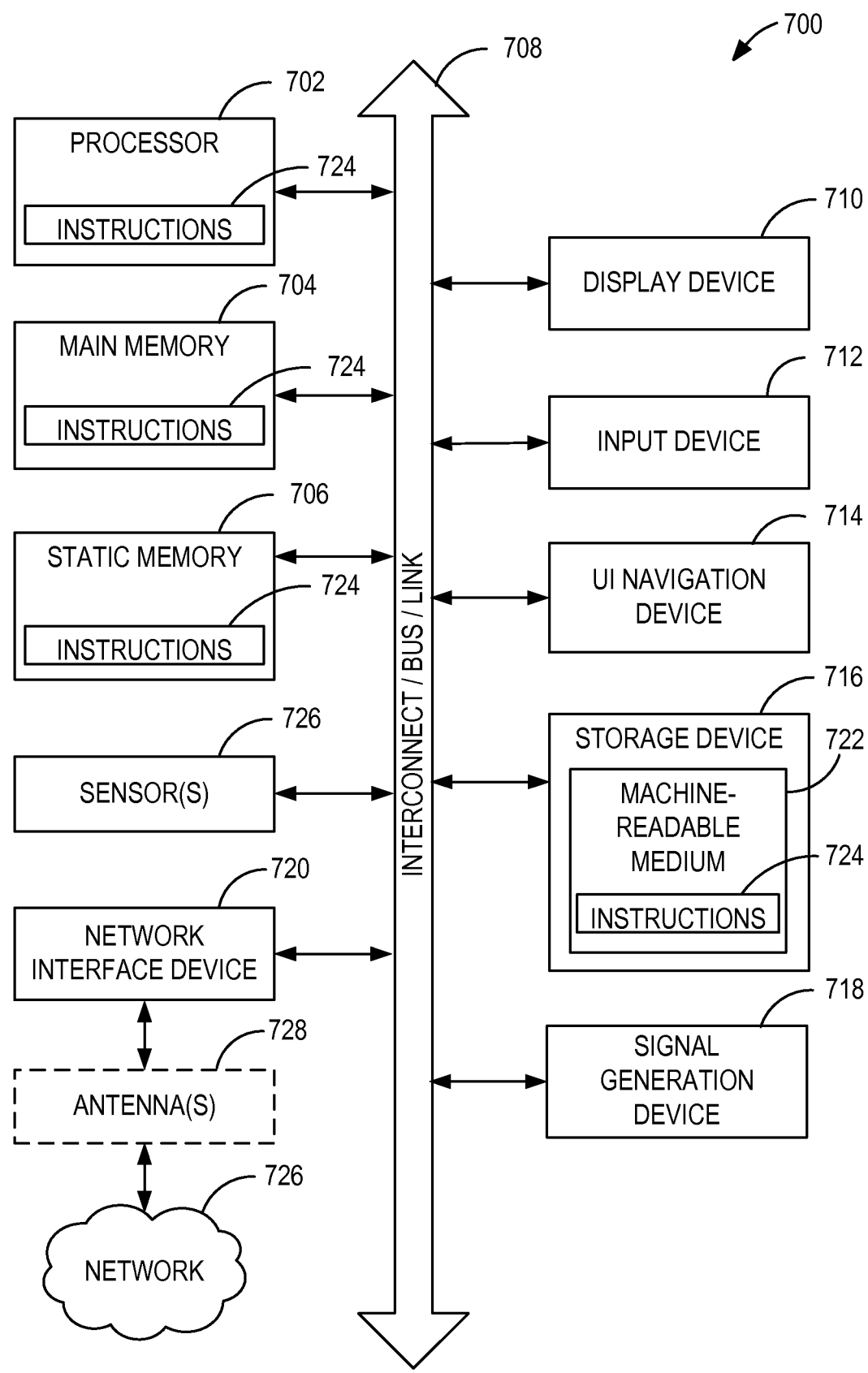
FIG. 7 is a block diagram of a machine in the example form of a computer system within which a set of instructions, for causing the machine to perform any one or more of the methodologies discussed herein, may be executed.

FIG. 7 illustrates a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus or interconnect). The computer system 700 may further include a video display unit 710, an input device 712 (e.g., an alphanumeric keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, location sensor, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). The communications with the communication network 726 optionally may occur using wireless transmissions sent via one or more antennas 728. Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WIMAX networks). The term "transmission medium" shall be taken to include any intangible medium that is capable of storing, encoding, or carrying instructions for execution by the machine, and includes digital or analog communications signals or other intangible medium to facilitate communication of such software The above description is intended to be illustrative, and not restrictive. For example, the above-described examples (or one or more aspects thereof) may be used in combination with others. Other embodiments may be used, such as by one of ordinary skill in the art upon reviewing the above description. In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for generating a user interface output, comprising electronic operations performed by at least one processor and memory of a computing system, the electronic operations comprising:
    parsing a definition of a user interface, the definition providing an indication of at least one function and at least one rule for a display of content in the user interface, wherein the definition of the user interface is provided in a first markup language, the definition including a plurality of entry points to access a collection of data, wherein the at least one rule includes a security rule associating at least one role of a plurality of roles with one of the entry points;
    determining a view technology stack, the view technology stack providing an interpretation of the definition of the user interface in a second markup language; and
    generating a user interface instance from the definition of the user interface with use of the view technology stack, the user interface instance providing renderable content using the second markup language, wherein the at least one function and the at least one rule define characteristics of the renderable content in the user interface instance, the at least one security rule customizing the display of content and entry points in the user interface dynamically presented to a logged in user of the user interface instance based on the role the user has logged in as to access the collection of data.

2. The method of claim 1, wherein the definition of the user interface that is provided in a first markup language is provided in a XML data format, wherein the XML data format is defined according to an XML data schema, and wherein the at least one function and the at least one rule are indicated in respective XML nodes of the definition.

3. The method of claim 1, wherein the electronic operations are performed by a web server, and wherein the user interface instance is a webpage hosted by the web server, the electronic operations further comprising:
    transmitting data of the user interface instance to a client computing device over a wide area network for display in a browser of the client computing device, wherein the second markup language is interpreted and displayed by the browser of the client computing device.

4. The method of claim 1, wherein the definition further provides an indication of at least one content type to include within the user interface instance, wherein the generating of the user interface instance occurs by the computing system on-demand in response to a request for display of the user interface instance.

5. The method of claim 1, the electronic operations further comprising rendering the user interface instance with the view technology stack, the view technology stack implementing the second markup language and a scripting language according to a defined format.

6. The method of claim 1, further comprising:
    providing at least one document generation feature in the user interface instance, wherein the at least one document generation feature generates a document from content dynamically presented in user interface instance.

7. A non-transitory computer-readable storage medium, the computer-readable storage medium including instructions that when executed by a computer, cause the computer to:
    parse a definition of a user interface, the definition providing an indication of a plurality of functions and a plurality of rules for a display of content in the user interface, wherein the definition of the user interface is provided in a first markup language according to a defined schema, the definition including a plurality of entry points to access a collection of data, and wherein the at least one rule includes a security rule associating at least one role of a plurality of roles with one of the entry points;
    select a view technology stack from a plurality of view technology stacks, the selected view technology stack providing an interpretation of the definition of the user interface according to a second markup language; and
    generate a user interface instance from the definition of the user interface with use of the selected view technology stack, wherein the user interface instance includes renderable content using the second markup language, wherein the functions and the rules define characteristics of the renderable content in the user interface instance, the at least one security rule customizing the display of content and entry points in the user interface dynamically presented to a logged in user of the user interface instance based on the role the user has logged in as to access the collection of data.

8. The computer-readable storage medium of claim 7, wherein the definition of the user interface that is provided in the first markup language is provided in a XML data format, wherein the XML data format is defined according to an XML data schema, and wherein the functions and the rules are indicated in respective XML nodes of the definition.

9. The computer-readable storage medium of claim 7, wherein the user interface instance is a webpage hosted by a web server, the instructions further to cause the computer to:
    transmit data of the user interface instance to a client computing device over a wide area network for display in a browser of the client computing device, wherein the second markup language is interpreted and displayed by the browser of the client computing device.

10. The computer-readable storage medium of claim 7, the instructions further to cause the computer to:
    render the user interface instance with the selected view technology stack, the selected view technology stack implementing the second markup language and a scripting language according to a defined format.

11. The computer-readable storage medium of claim 7, the instructions further to cause the computer to:
    display at least one document generation feature in the user interface instance, wherein the at least one document generation feature enables generation of a document from content dynamically presented in user interface instance.

12. The computer-readable storage medium of claim 7, wherein the definition of the user interface further provides an indication of at least one content type to include within the user interface instance, wherein generation of the user interface instance occurs by the computing on-demand based on a request to display the user interface instance.

13. A computing apparatus, the computing apparatus comprising:
   at least one processor;
   at least one storage device comprising instructions, which when executed by the at least one processor, configure the at least one processor to:
   parse a definition of a user interface, the definition providing an indication of at least one function and at least one rule for a display of content in the user interface, wherein the definition of the user interface is provided in a first markup language, the definition including a plurality of entry points to access a collection of data, and wherein the at least one rule includes a security rule associating at least one role of a plurality of roles with one of the entry points;
   implement a view technology stack, the view technology stack providing an interpretation of the definition of the user interface in a second markup language; and
   generate a user interface instance from the definition of the user interface with use of the view technology stack, the user interface instance providing renderable content using the second markup language, wherein the at least one function and the at least one rule define characteristics of the renderable content in the user interface instance, the at least one security rule customizing the display of content and entry points in the user interface dynamically presented to a logged in user of the user interface instance based on the role the user has logged in as to access the collection of data.

14. The computing apparatus of claim 13, wherein the at least one processor is further configured to: provide a desktop website interface and a mobile device website interface using a first view technology stack for the desktop website interface and a second view technology stack for the mobile device website interface.

15. The computing apparatus of claim 13, wherein the definition of the user interface that is provided in the first markup language is provided in XML data, wherein the XML data is defined according to an XML schema, wherein the at least one function and the at least one rule are indicated in the XML data.

* * * * *